(12) United States Patent
Costanzo

(10) Patent No.: US 10,343,851 B2
(45) Date of Patent: Jul. 9, 2019

(54) ARTICLE DIVERTING CONVEYOR BELT

(71) Applicant: Laitram, L.L.C., Harahan, LA (US)

(72) Inventor: Mark Costanzo, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/747,459

(22) PCT Filed: Aug. 3, 2016

(86) PCT No.: PCT/US2016/045266
§ 371 (c)(1),
(2) Date: Jan. 25, 2018

(87) PCT Pub. No.: WO2017/023983
PCT Pub. Date: Feb. 9, 2017

(65) Prior Publication Data
US 2018/0215554 A1 Aug. 2, 2018

Related U.S. Application Data

(60) Provisional application No. 62/201,151, filed on Aug. 5, 2015.

(51) Int. Cl.
| | | |
|---|---|---|
| *B65G 15/30* | (2006.01) | |
| *B65G 47/53* | (2006.01) | |
| *B65G 47/64* | (2006.01) | |
| *B65G 13/02* | (2006.01) | |
| *B65G 39/02* | (2006.01) | |
| *B65G 17/24* | (2006.01) | |
| *B65G 17/40* | (2006.01) | |
| *B65G 17/34* | (2006.01) | |

(52) U.S. Cl.
CPC .............. *B65G 47/53* (2013.01); *B65G 15/30* (2013.01); *B65G 17/24* (2013.01); *B65G 17/345* (2013.01); *B65G 17/40* (2013.01); *B65G 47/64* (2013.01)

(58) Field of Classification Search
CPC ........ B65G 15/30; B65G 47/53; B65G 47/64; B65G 13/02; B65G 13/06; B65G 39/02
USPC .......................... 198/370.09, 779, 850, 853
See application file for complete search history.

(56) References Cited

U.S. PATENT DOCUMENTS

| | | | |
|---|---|---|---|
| 3,964,588 A | 6/1976 | Kornylak | |
| 4,096,936 A * | 6/1978 | Nielsen ................ | B65G 17/345 198/370.06 |
| 6,148,990 A | 11/2000 | Lapeyre et al. | |
| 6,669,012 B1 * | 12/2003 | Yoshida ............... | B65G 17/345 198/370.06 |
| 6,705,452 B2 | 3/2004 | Greve et al. | |
| 6,802,412 B2 | 10/2004 | Lapeyre et al. | |
| 6,997,309 B2 | 2/2006 | Stebnicki et al. | |
| 7,080,725 B2 * | 7/2006 | Hishinuma ......... | B65G 17/345 198/370.06 |
| 7,506,751 B2 | 3/2009 | Fourney | |
| 7,556,136 B2 | 7/2009 | Marshall et al. | |
| 8,167,118 B2 | 5/2012 | Fourney | |
| 8,225,922 B1 | 7/2012 | Fourney | |
| 8,646,596 B2 | 2/2014 | Andersen | |

(Continued)

*Primary Examiner* — Douglas A Hess
(74) *Attorney, Agent, or Firm* — Catherine M. Bishop

(57) ABSTRACT

An article-diverting modular conveyor belt employs a transverse article diverter comprising rollers. The rollers are formed in a transverse diverting belt wrapped around a module or embedded in the module. The rollers can be activated by contact, motorization or linear induction.

11 Claims, 5 Drawing Sheets

(56) References Cited

U.S. PATENT DOCUMENTS

| | | | | |
|---|---|---|---|---|
| 9,428,338 B2* | 8/2016 | Ragan | .................... | B65G 17/24 |
| 9,434,547 B2* | 9/2016 | Marshall | ................ | B65G 17/08 |
| 2003/0221935 A1 | 12/2003 | Barklin et al. | | |
| 2009/0173598 A1* | 7/2009 | Fourney | | |
| 2009/0200139 A1 | 8/2009 | Kissee et al. | | |
| 2010/0072026 A1 | 3/2010 | Russel et al. | | |
| 2010/0078297 A1 | 4/2010 | Andersen | | |
| 2011/0073442 A1* | 3/2011 | Rau et al. | | |
| 2017/0073171 A1* | 3/2017 | Menke et al. | | |

* cited by examiner

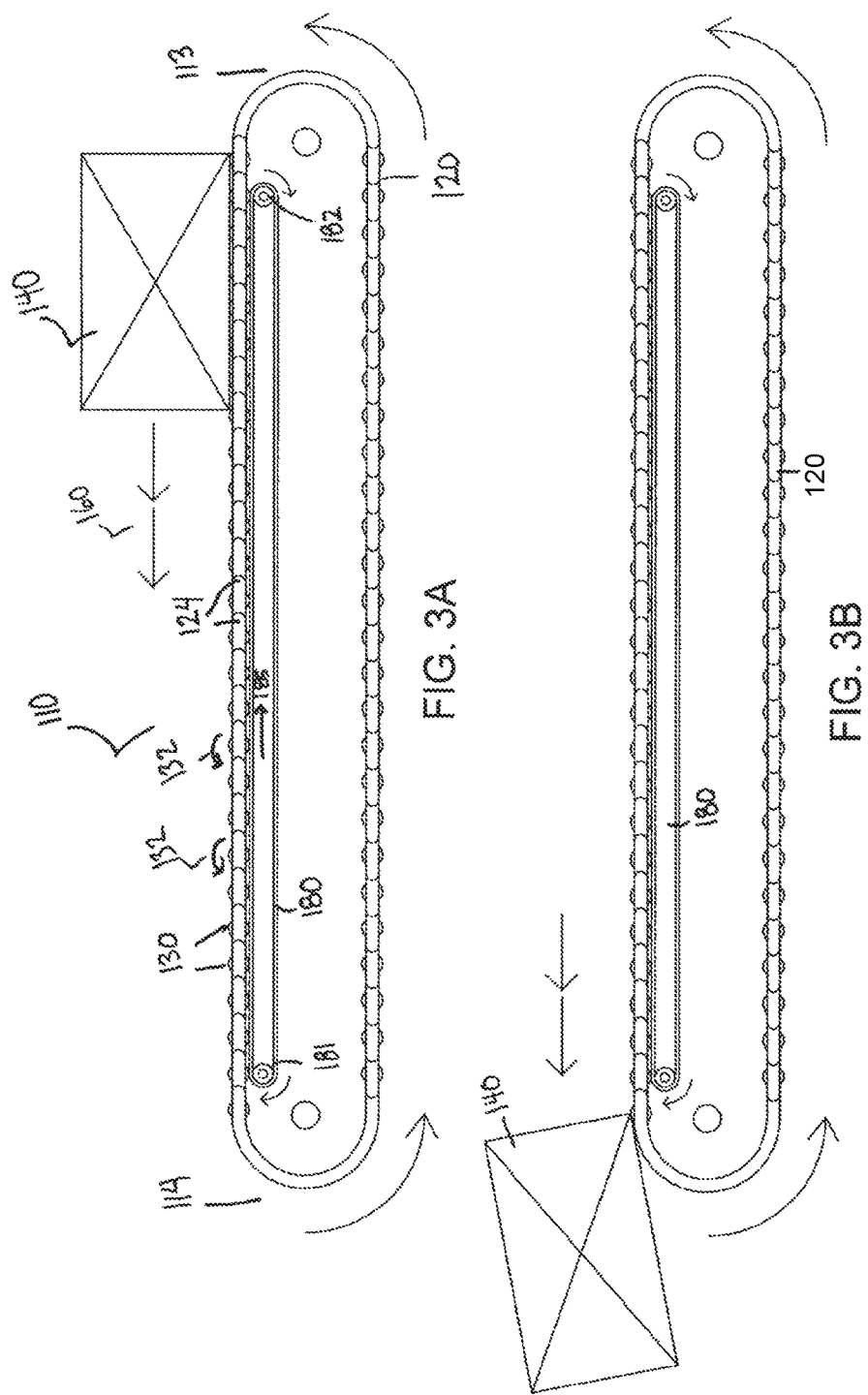

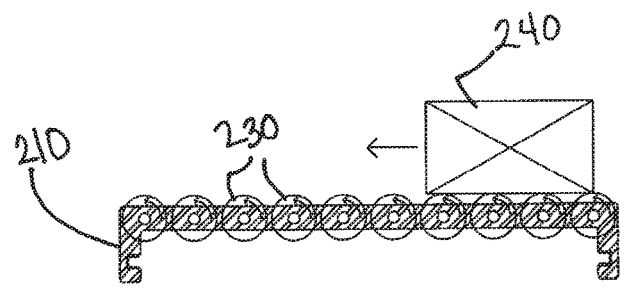
FIG. 4A
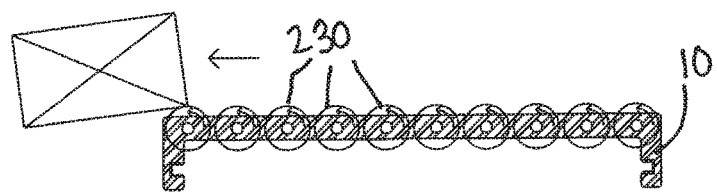
FIG. 4B
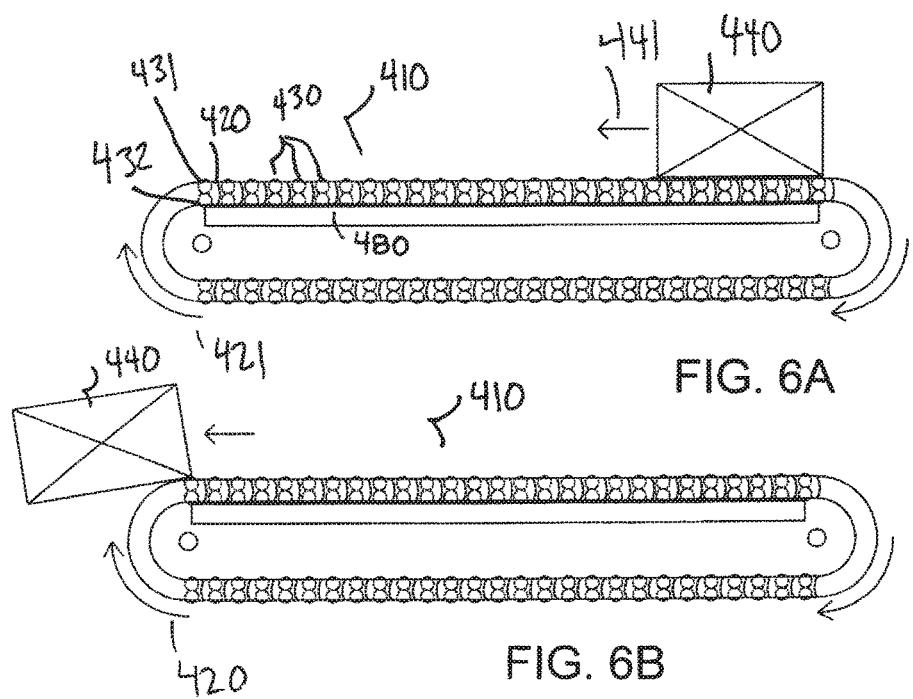
FIG. 6A
FIG. 6B

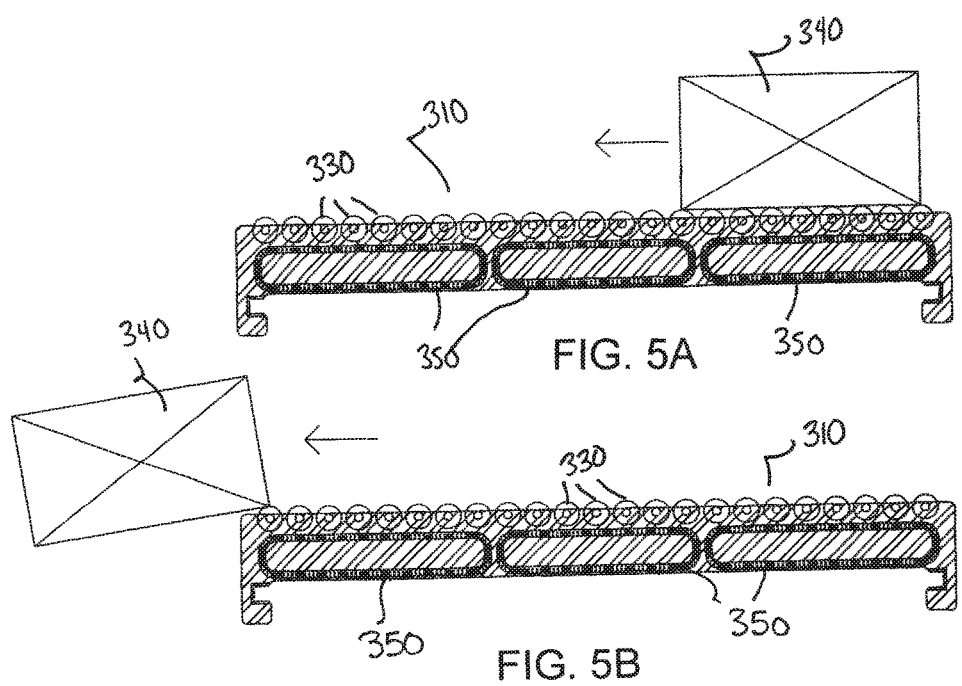

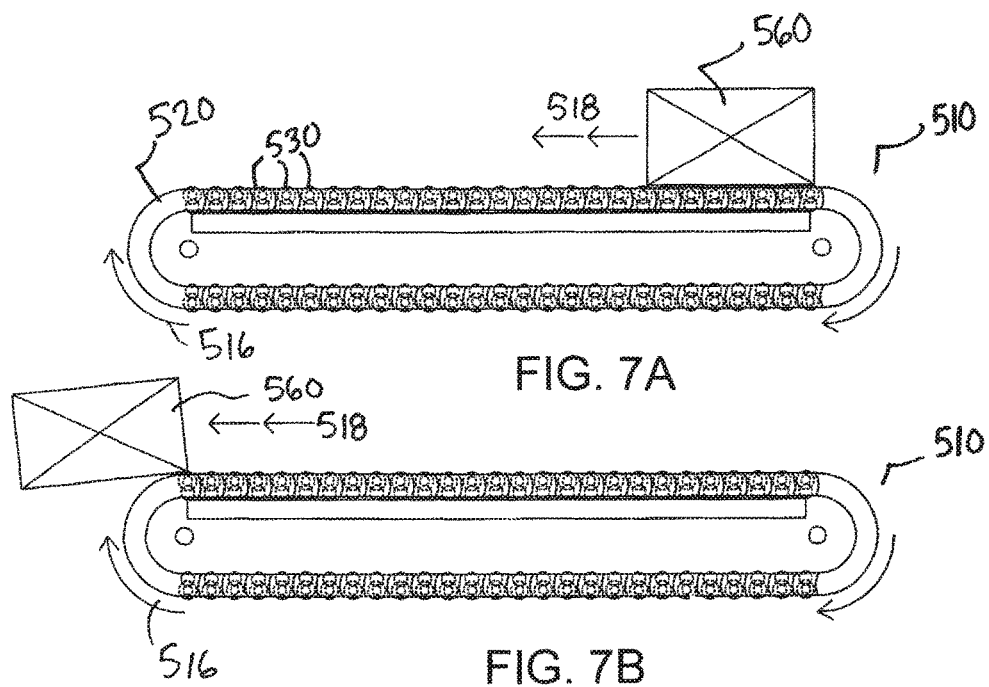
FIG. 7A
FIG. 7B
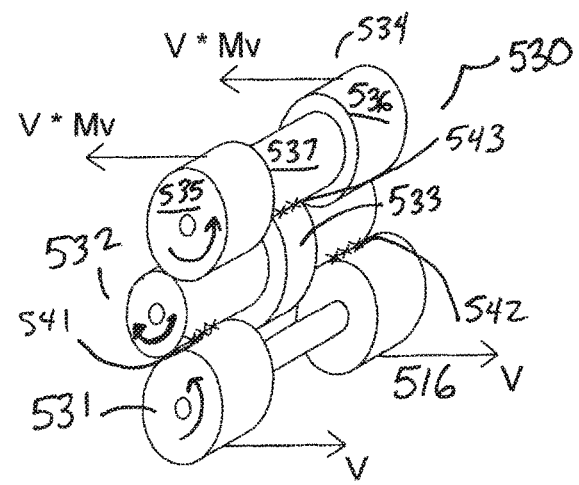
FIG. 8

ARTICLE DIVERTING CONVEYOR BELT

RELATED APPLICATIONS

The present application claims priority to U.S. Provisional Patent Application Ser. No. 62/201,151, filed Aug. 5, 2015 and entitled "Article Diverting Conveyor Belt", the contents of which are herein incorporated by reference.

BACKGROUND

The invention relates generally to power-driven conveyors and more particularly to conveyors including article-diverting devices for transporting articles in a selected direction.

Some conveying applications require that selected articles being conveyed along a main conveying path be diverted off the main path and conveyed away in another direction, while the rest of the articles continue to advance along the main path. But article-diverting devices tend to have a lot of moving parts, which can be difficult to clean and not practical for use in food-handling and other sanitary applications. In addition, many article-diverting devices employ rollers, which present an unsteady surface for products.

SUMMARY

An article-diverting conveyor belt embodying features of the invention comprises a plurality of modules hingedly connected together. At least one module includes a transverse endless belt having rollers for carrying articles across the module towards a side of the module.

According to one aspect of the invention, a conveyor belt module comprises a body extending in length from a forward end to a rearward end and in width from a first side edge to a second side edge and in thickness from a top side to an opposite bottom side, a plurality of hinge elements extending from the forward end and the rearward end and a transverse diverting belt arranged to move transversely relative to the body. The transverse diverting belt includes at least one roller rotatable about an axis.

According to another aspect, a conveyor belt module, comprises a body extending in length from a forward end to a rearward end and in width from a first side edge to a second side edge and in thickness from a top side to an opposite bottom side, a plurality of hinge elements extending from the forward end and the rearward end and a plurality of rollers having outer surfaces extending above the top side to form a conveying surface, the rollers having axes of rotation substantially parallel to the first side edge and second side edge.

According to another embodiment, a method of diverting a package from a conveyor belt comprising a plurality of hingedly connected modules traveling in a first direction, the method comprises the steps of conveying the package placed on transverse rollers extending above a top surface of a first module in the first direction and activating the transverse rollers to push the package towards a side edge of the first module and discharge the package from the module.

BRIEF DESCRIPTION OF THE DRAWINGS

These features of the invention, as well as other aspects and advantages, are described in more detail in the following description, appended claims, and accompanying drawings, in which:

FIG. 3A is a rear view of a conveyor belt module including an article diverter comprising rollers and a powered carryway in the conveyor belt module;

FIG. 3B shows the conveyor belt module of FIG. 3A during discharge of a package;

FIG. 4A is a rear view of a conveyor belt module including an article diverter comprising motorized rollers;

FIG. 4B shows the conveyor belt module of FIG. 4A during discharge of a package;

FIG. 5A is a rear view of a conveyor belt module including an article diverter comprising rollers powered by a linear induction motor;

FIG. 5B shows the conveyor belt module of FIG. 5A during discharge of a package;

FIG. 6A is a rear view of a conveyor belt module including an article diverter comprising embedded roller assemblies for directing an article off the conveyor belt module;

FIG. 6B shows the conveyor belt module of FIG. 6A during discharge of a package;

FIG. 7A is a rear view of a conveyor belt module including an article diverter comprising geared roller assemblies for directing an article off the conveyor belt module;

FIG. 7B shows the conveyor belt module of FIG. 7A during discharge of a package;

FIG. 8 is an isometric view of a geared roller assembly suitable for use in an article diverter according to an embodiment of the invention.

DETAILED DESCRIPTION

A conveyor belt employs a transverse article diverter having rollers on a module to provide a diverting surface for moving products relative to the direction of conveyance. The invention will be described below relative to certain illustrative embodiments, though those skilled in the art will recognize that the invention is not limited to the illustrative embodiments.

Figure 1:
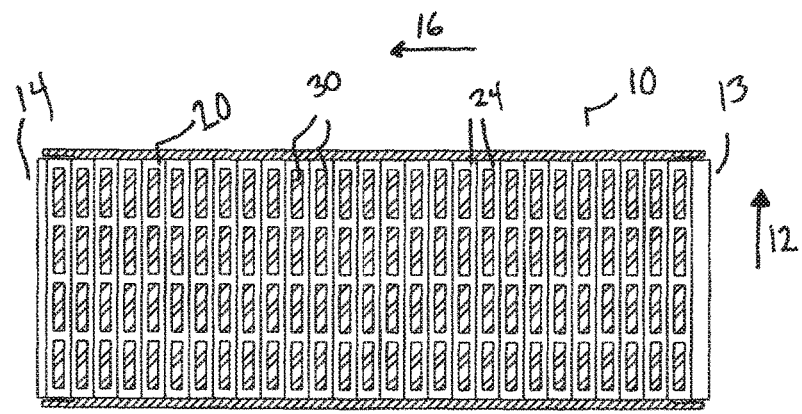
FIG. 1 is a top view of a conveyor belt module including an article diverter comprising rollers.

FIG. 1 is a top view of a conveyor belt module 10 including a transverse diverting belt 20 comprising rollers 30. The rollers 30 form a conveying surface for conveying a package 40. A number of base modules 10 are connected together to form a main conveyor belt moving in direction 12. For example, the base modules 10 may include hinge elements on forward and rearward edges to hingedly connect multiple base modules to form a conveying belt or surface extending in the direction 12. The illustrative rollers 30 rotate about longitudinal axes that are substantially parallel to a direction of belt travel 12. The transverse diverting belt 20 is trained around belt-guiding members 21, 22 at both sides of the module 10. In an upper span, the transverse diverting belt extends from a first side edge 13 of the module to the second side edge 14 of the module and returns to the first side edge 13 in a lower span, wrapping around the side edges 13, 14. The illustrative transverse diverting belt 20 comprises a plurality of connected modules 24, but the invention is not so limited. The rollers 30 protrude above and below the modules 24. The illustrative rollers 30 are arranged transverse to the direction of main conveyor belt travel 12. The axes of the rollers are parallel to direction 12 and parallel to the side edges 13, 14 so that the rollers 30 spin to push a package 40 in direction 16. Alternatively, the rollers 30 may have another suitable orientation.

The transverse diverting belt 20 may be driven through any suitable means. According to one embodiment, the transverse diverting belt 20 includes a protrusion 60 for driving the transverse diverting belt 20. The protrusion 60 engages a track (not shown), which slides the diverting belt 20 towards one side or another as the base module 10 travels over the track.

The protrusion can have any suitable size, shape or configuration. For example, the protrusion 60 can comprise a bolt threaded through an embedded nut in the transverse module 24. In another embodiment, the protrusion 60 is a molded rod, a steel rod, cam follower or other type of protrusion extending from a transverse module 24.

In another embodiment, a gearing system that frictionally contacts the diverting belt may induce motion in the diverting belt 20. One skilled in the art will recognize that any suitable means for driving the transverse diverting belt 20 may be used.

As the transverse diverting belt 20 moves over the substrate of the base module 10, the contact between the rollers 30 and substrate induces rotation of the rollers 30

Figure 2A:
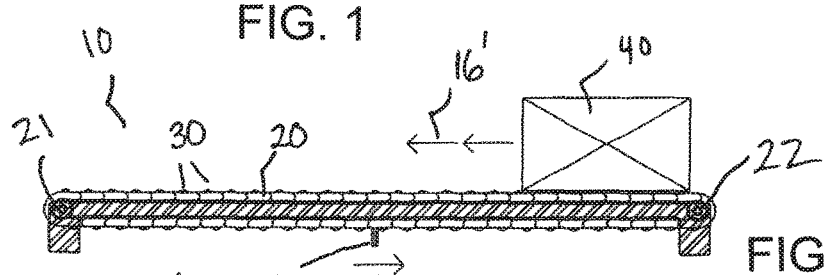
FIG. 2A is a rear view of the conveyor belt module of FIG. 1 while diverting a package.
Figure 2B:
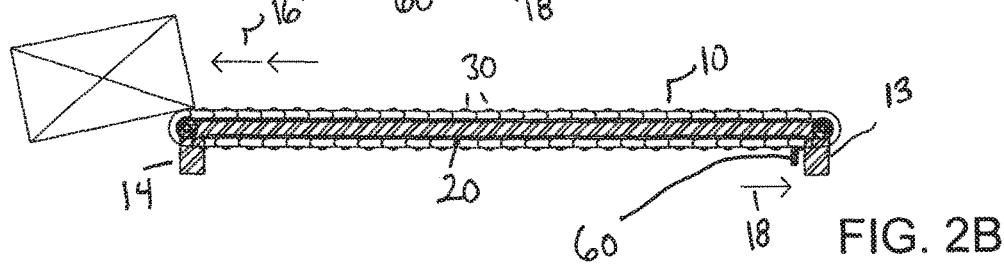
FIG. 2B is a rear view of the conveyor belt module of FIG. 2A while discharging a package.

Referring to FIGS. 2A and 2B, when the protrusion 60 is pushed in a first direction 18, towards the first side 13 of the base module 10, the top span of the diverting belt 20 moves in an opposite direction 16, towards the second side 14 of the base module 10. The rollers 30 contact the base module substrate and spin about their axis, which pushes a package 40 towards the second side 14 of the base module at a discharge speed 16' that is double the speed of the diverting belt 20. The package 40 riding on the rollers 30 travels twice as fast as the protrusion 60. FIG. 2B shows the package 40 being discharged off the second side 14 of the base module 10.

FIGS. 3A and 3B show another embodiment of a conveyor belt module 110 including a transverse diverting belt 120 comprising rollers 130 embedded in modules 124. The rollers 130 form a conveying surface for conveying a package 140. The transverse diverting belt 120 may be driven using any suitable means, such as a protrusion as described above. In addition, the base conveyor belt module 110 includes a powered carryway 180 for the transverse diverting belt 120 that is capable of affecting the speed of rotation of the rollers 130, and therefore the speed of the product 140 carried by the conveyor belt module 110. The powered carryway 180 comprises a flat belt trained around rollers 181, 182 and driven by a motor. In an upper span, the flat belt 180 contacts the bottoms of the rollers 130. When the top span moves in direction 185 towards a first side 113 of the module 110, the rollers 130 spin about their axes in direction 132, pushing the package 140 in direction 160. The speed and direction of the belt 180 can be adjusted to adjust the speed and direction of rotation of the rollers 130 to control package movement.

According to another embodiment of the invention, shown in FIGS. 4A and 4B, a transverse article diverter comprises an array of motorized rollers 230 embedded in a base module 210. The motorized rollers 230 form a conveying surface for conveying a package 240. The motorized rollers 230 selectively rotate to push a package towards one side of the module or another.

FIGS. 5A and 5B show another embodiment of a conveyor belt module 310 having a transverse article diverter including rollers 330. The rollers 330 are embedded in the body of the module 310 and rotate about axes that are parallel to a direction of belt travel of the base module 310.

The rollers 330 form a conveying surface for conveying a package 340. The rollers 330 are powered by linear induction. An electric current is applied to coils 350 embedded in the body of the module below the rollers to induce rotation in the rollers 330.

FIGS. 6A and 6B show another embodiment of a conveyor belt module 410 having a transverse article diverting belt 420 comprising roller assemblies 430. Each roller assembly 430 comprises a set of mutually-actuating rollers 431, 432. The top roller 431 forms a conveying surface for a package 440. The bottom roller 432 contacts a carryway 480 formed in the module body 410. The carryway 480 can be powered or stationary. As the transverse article diverting belt 420 moves about a circuit in direction 421, the contact between the carryway and bottom rollers 432 induces rotation of the bottom rollers 432 in an opposite direction. The rotation of the bottom rollers 432 induces rotation of the top rollers 431 in an opposite direction, pushing the package 440 in direction 441.

FIGS. 7A and 7B show another embodiment of a conveyor belt module 510 having a transverse article diverting belt 520 comprising hinged modules with geared roller assemblies 530 embedded therein. FIG. 8 shows an embodiment of a geared roller assembly 530 suitable for implementation in a transverse article diverting belt according to one embodiment. As shown, the geared rollers are in a compound gear train setup, with a first gear 531 contacting an upper surface of the module 510 to induce rotation of the first gear 531 in a first direction and at a first velocity V when the transverse article diverting belt 520 moves in direction 516 at velocity V. The first gear 531 contacts a middle gear 532 at locations 541, 542, to induce rotation of the middle gear 532 in an opposite direction. The middle gear 532 has an enlarged central ring 533 that contacts an upper gear 534 at location 543 to induce rotation of the upper gear 534 in the same direction as the first gear 531. The upper gear 534 has outer portions 535, 536 that are larger than the inner portion 537, which contacts the enlarged central ring 533 of the middle gear 532. The outer portions 535, 536 form an article transporting surface. The linear output speed of the upper gear 534 is a factor of the gear train's velocity ratio (Mv). Therefore, movement of the transverse article diverting belt 520 at velocity V in direction 516 will push an article 560 resting on the upper gear 534 in direction 518 at a velocity of V*Mv. As shown in FIG. 7B, the roller assemblies 530 can be activated to push an article 560 off the side of the module 510. The geared roller assembly 530 can have any suitable number of rollers of any size to affect the velocity ratio and direction of rotation. The transverse article diverting belt 520 can be driven through any suitable means, such as a protrusion or gearing system as described above, or through any suitable means known in the art. The module 510 can have a static or powered upper surface forming the carryway for the transverse article diverting belt 520.

Although the invention has been described with reference to specific versions, other versions are possible. The scope of the invention is not meant to be limited to the exemplary versions described in detailed.

What is claimed is:
1. A conveyor belt module, comprising:
   a body extending in length from a forward end to a rearward end and in width from a first side edge to a second side edge and in thickness from a top side to an opposite bottom side;
   a plurality of hinge elements extending from the forward end and the rearward end; and a transverse diverting belt trained around belt guiding members and arranged to move transversely relative to the body, the transverse diverting belt including a plurality of rollers rotatable about an axis and forming a conveying surface, so that when the transverse diverting belt moves transversely over the body, the rollers contact the top side of the body to induce rotation of the rollers, so that a package riding on the rollers travels twice as fast as the transverse diverting belt.

2. The conveyor belt module of claim 1, wherein the rollers extend above the top of the transverse diverting belt.

3. The conveyor belt module of claim 1, wherein the transverse diverting belt extends from the first side edge to the second side edge above the top side in an upper span and extends from the first side edge to the second side edge below the bottom side in a lower span.

4. The conveyor belt module of claim 1, wherein the transverse diverting belt includes a protrusion in the lower span for engaging a track to move the transverse diverting belt relative to the body.

5. The conveyor belt module of claim 1, wherein the top side of the body comprises a movable flat belt trained around rollers.

6. The conveyor belt module of claim 1, wherein the transverse diverting belt includes a roller assembly comprising at least two mutually-actuating rollers, a first roller contacting the top side of the body and a second roller forming an article conveying surface.

7. A conveyor belt module, comprising:
a body extending in length from a forward end to a rearward end and in width from a first side edge to a second side edge and in thickness from a top side to an opposite bottom side;
a plurality of hinge elements extending from the forward end and the rearward end; and
a transverse diverting belt arranged to move transversely relative to the body, the transverse diverting belt including at least one roller forming a conveying surface, the at least one roller rotatable about an axis, the transverse diverting belt further including a protrusion in a lower span for engaging a track to move the transverse diverting belt relative to the body.

8. The conveyor belt module of claim 7, wherein the transverse diverting belt comprises a plurality of connected modules.

9. The conveyor belt module of claim 8, wherein the at least one roller protrudes above and below the connected modules, so that when the transverse diverting belt moves transversely over the body, the rollers contact the top side of the body to induce rotation of the rollers, causing a package riding on the rollers to travel twice as fast as the transverse diverting belt.

10. A conveyor belt module, comprising:
a body extending in length from a forward end to a rearward end and in width from a first side edge to a second side edge and in thickness from a top side to an opposite bottom side;
a plurality of hinge elements extending from the forward end and the rearward end; and
a transverse diverting belt arranged to move transversely relative to the body, the transverse diverting belt including a roller assembly comprising at least two mutually-actuating rollers, a first roller contacting the top side of the body and a second roller forming an article conveying surface.

11. The conveyor belt module of claim 10, wherein the transverse diverting belt includes a protrusion in the lower span for engaging a track to move the transverse diverting belt relative to the body.

* * * * *